(12) United States Patent  
Glueck

(10) Patent No.: US 7,526,967 B2  
(45) Date of Patent: May 5, 2009

(54) MEASURING DEVICE FOR DETECTING STRESSES OF A BEARING ARRANGEMENT

(75) Inventor: Stefan Glueck, Niederwerrn (DE)

(73) Assignee: Schaeffler KG, Herzogenaurach (DE)

( * ) Notice: Subject to any disclaimer, the term of this patent is extended or adjusted under 35 U.S.C. 154(b) by 175 days.

(21) Appl. No.: 11/574,992

(22) PCT Filed: Aug. 12, 2005

(86) PCT No.: PCT/DE2005/001425

§ 371 (c)(1),
(2), (4) Date: Mar. 30, 2007

(87) PCT Pub. No.: WO2006/026948

PCT Pub. Date: Mar. 16, 2006

(65) Prior Publication Data

US 2008/0092664 A1     Apr. 24, 2008

(30) Foreign Application Priority Data

Sep. 10, 2004   (DE) .................. 10 2004 043 754

(51) Int. Cl.
*G01L 1/24* (2006.01)
*G01L 5/12* (2006.01)
*G01B 11/02* (2006.01)

(52) U.S. Cl. .............. 73/862.49; 73/800; 356/498; 356/505

(58) Field of Classification Search .................. 73/800, 73/862.49; 33/791, 707; 356/498, 503, 625, 356/638, 505
See application file for complete search history.

(56) References Cited

U.S. PATENT DOCUMENTS 6,055,053 A * 4/2000 Lesniak ..................... 73/800
6,609,831 B2 * 8/2003 Urbanzyk et al. ........... 384/448
2004/0261543 A1 * 12/2004 Van Leeuwen et al. ... 73/862.49

FOREIGN PATENT DOCUMENTS

| DE | 38 04 767 A |   | 7/1989 |
| EP | 0 810 426 A |   | 12/1997 |
| JP | 57136117 A | * | 8/1982 |
| JP | 59060333 A | * | 4/1984 |
| SU | 1 719 846 A |   | 3/1992 |
| WO | 02/44678 A |   | 6/2002 |

* cited by examiner

*Primary Examiner*—Harshad Patel
*Assistant Examiner*—Jonathan Dunlap

(57) ABSTRACT

A measuring device for detecting stresses of a bearing arrangement. The stresses are measured based on elastic changes in shape. The inventive measuring device includes a light source, which is directed onto a light passage, and a light sensor. The dimensions of a portion of the light that penetrates the light passage and impinges the light sensor can be modified by elastically changing the shape of the light passage.

10 Claims, 2 Drawing Sheets

MEASURING DEVICE FOR DETECTING STRESSES OF A BEARING ARRANGEMENT

FIELD OF THE INVENTION

The invention relates to a measuring device for detecting stresses of a bearing arrangement, it being possible for the stresses to be measured using elastic shape changes.

BACKGROUND OF THE INVENTION

A measuring device of this type is described in DE 26 42 044 B1. Static and dynamic stresses of a roller bearing are determined in an elaborate form by means of strain gages. One characteristic variable for the determination of the stress of the bearing is the elastic deformation of the bearing itself. The deformation of a bearing ring with rolling contact under loads is, as a rule, detected by the strain gages. For this purpose, the strain gages are fastened directly to the stressed bearing ring. This sensor system needs installation space on the bearing and is to be protected against environmental influences. Arrangements of this type are therefore complicated as a rule.

SUMMARY OF THE INVENTION

It is therefore the object of the invention to provide a simple and inexpensive measuring device which is relatively insensitive with respect to influences from the environment.

This object is achieved according to the subject matter of claim 1 by an optical measuring device having the following features:

- The measuring device has at least one light source. All technical light sources are conceivable, such as light emitting diodes, laser sources, infrared light sources, lamps, etc. The type of light, as a rule a bundle of rays, can be selected alternatively and is dependent on the selected light source.
- The measuring device has at least one or more light passages which are arranged appropriately in the vicinity of the bearing arrangement. The light passage is, for example, a gap, a slot or a hole, or a passage for light of another design. Part of the light of the light source is kept back at the edge of the light passage. The other part of the light passes through the passage and strikes the light sensor or a reflector in an unobstructed manner. The passage cross section of the light passage is variable by deformations at the edges which delimit the light passage. It is also conceivable that the edges are displaced with respect to an initial position without being deformed and therefore change the light passage. Stresses of the bearing lead to elastic deformations of the material of the support, at least in that region, in which the light passage is formed. As a consequence of this, the edges which lie opposite one another and delimit the light passage come closer to each other or are displaced, or move further away from one another. The light passage/gap therefore acts as an aperture. The free opening of the aperture changes in an analogous manner to the magnitude of the stresses which are exerted on the bearing.
- Stresses are all of the action and reaction forces which act on the bearing and result from the mounting of a component which can be moved rotationally or linearly.
- The sensor or sensors is/are, depending on the light source, all suitable technical transducers of light, such as light-sensitive resistors, photodiodes, phototransistors or the like.

The support is seated either between a component, which is to be mounted movably by the bearing arrangement, and the bearing arrangement, or the support supports the bearing arrangement by way of the component with respect to the surroundings. In the first case, the stresses are transferred from the component via the support to the bearing arrangement. Example: the support is seated radially between a shaft journal and an inner ring of a rotary bearing, in which the shaft is mounted rotatably. In the latter case, one refinement of the invention, the stresses are transferred from the component to the bearing arrangement and then to the support. Example: bearing flange or bearing support which is fixed to the housing between a housing and a bearing, in which the component is mounted by means of at least the rotational/linear bearing.

The device according to the invention is of simple and robust configuration and can be manufactured inexpensively. It is thus conceivable, as one refinement of the invention provides, to configure the light passage/the light passages in an adapter or supporting ring. The supporting ring can be manufactured as desired from plastic or other suitable materials and can be provided with the light passages. The sensor system comprising the light source and the sensor and all necessary further electrical and electronic components are either arranged separately from the supporting ring or are optionally integrated into the latter.

Bearing arrangements are to be understood as all rotational or linear bearings or optionally combinations of these which mount one or more components in a rotationally movable or linearly displaceable manner. The measuring device is preferably used on rotary, sliding or roller bearings.

Special manufacturing preparation of the bearings for use with a device according to the invention is not necessary. The use of all desired radial or axial bearings, or combinations of these, is conceivable. The essential components of the measuring device can be integrated into an adapter ring. The adapter ring, if it is made, for example, from plastic, can be adapted as desired to surrounding constructions which are already present. On account of the spatial distance of the light passage from the stressed bearing, the stresses of the bearing point can be measured without the influence of the elastic deformations at bearing rings on the measured values. In the event of corresponding proximity to the bearing and sufficient flexibility of the support in the region of the light passages, however, deformations of this type can also be detected by way of the measuring device. The measuring device permits the detection of bearing loads in ranges from small to high loads, and therefore makes it possible, for example, to detect unbalances.

The measuring device is secured against destruction as a result of overloading. In such a case, for example, the elastic regions with the light passages are connected in series or in parallel with rigid parts of the support. The rigid supports absorb the overloading in the sense of an overload safeguard. It is also conceivable that an overload safeguard of this type is predefined by the size of the light passage, that is to say by the height of the gap itself. If a defined load is exceeded, the element edges which lie opposite one another at the gap then come into contact with one another, for example, with the result that the gap width of the light passage is equal to zero at least in regions.

In a further alternative refinement of the invention, the sensor system/measuring device at least comprising the light sensors and the light sources, connection elements and further electronic components is optionally preassembled as one structural unit, for example, on a mounting plate. The structural unit is plugged into the supporting ring during assembly of the measuring device.

The changing brightness of the light, ageing of the light source or of the light sensor, fluctuations in the current supply or the influence of the environment such as temperature and air humidity, etc., possibly influence and falsify the measured results. For this reason, the measuring device has, as a rule, a further comparative sensor in addition to the light sensor and/or is provided with a comparison light source in addition to the light source, with the result that a comparison of the actual and the setpoint values can be performed continuously.

DETAILED DESCRIPTION OF THE INVENTION

Figure 1A:
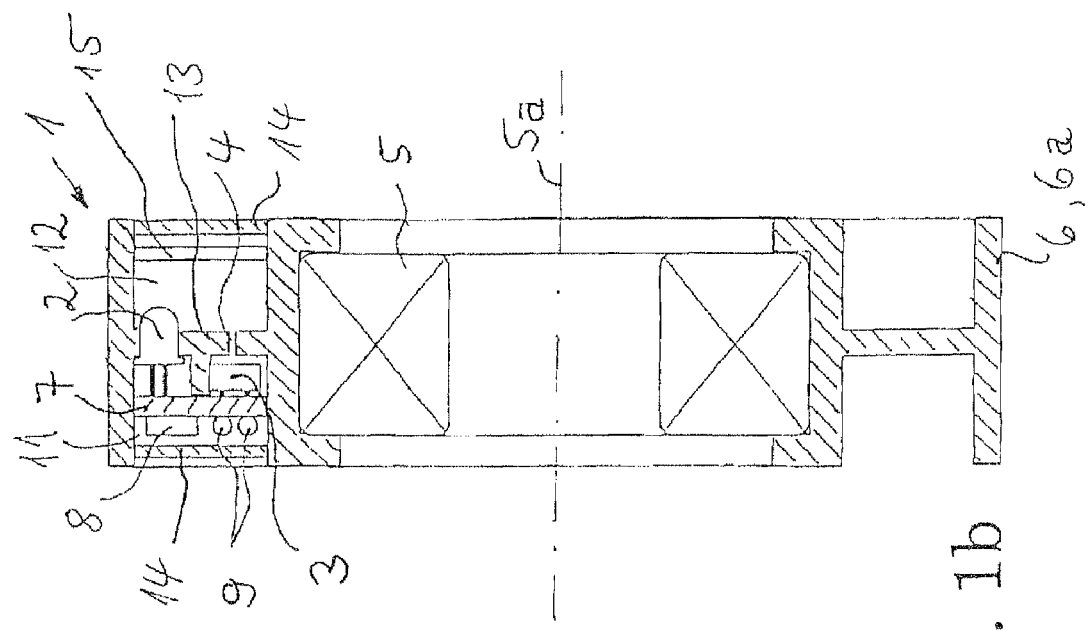
FIG. 1a is a longitudinal sectional view of the measuring device before final assembly.
Figure 1B:
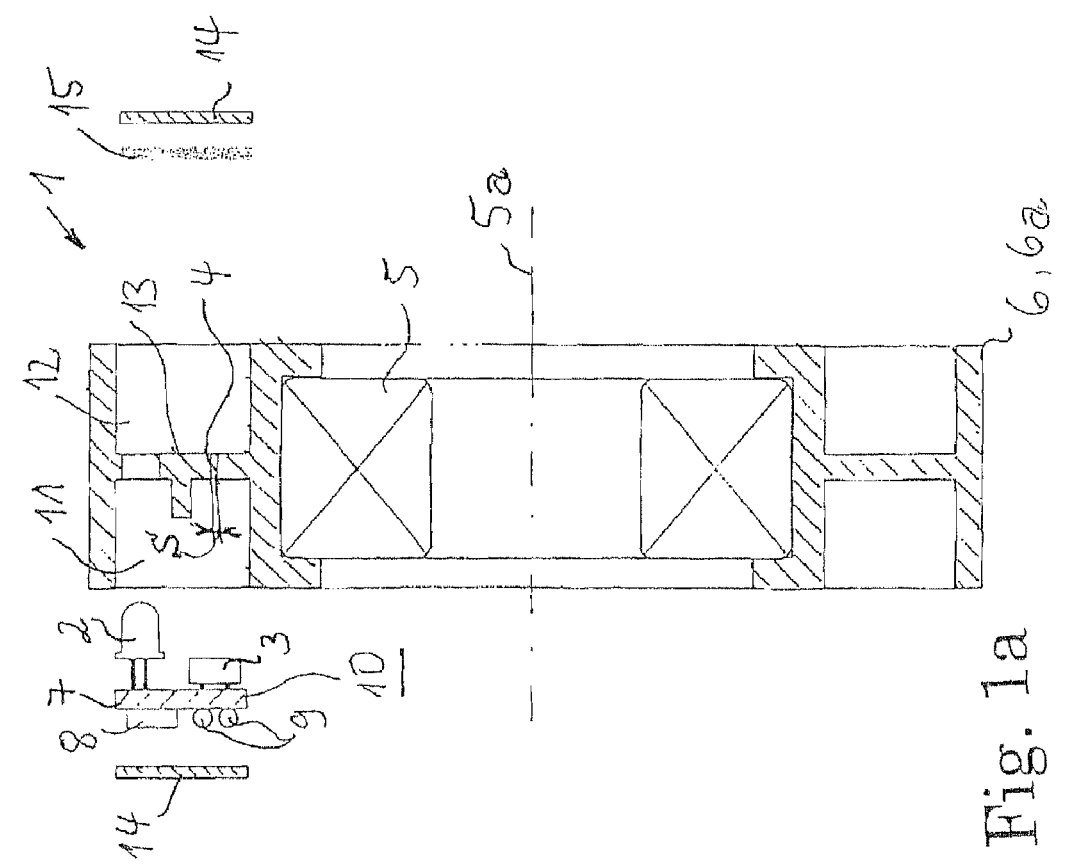
FIG. 1b is a longitudinal sectional view of the measuring device as an assembled module.

Referring now to the preferred embodiment of a measuring device for detecting stresses of a bearing arrangement according to the invention is disclosed. FIG. 1a shows the measuring device 1 before final assembly, and FIG. 1b shows the measuring device 1 as a finally assembled module. In this case, the bearing arrangement 5 is a radial bearing, for example a roller or sliding bearing. The measurement device 1 has at least one light source 2, at least one light sensor 3 and at least one light passage 4. The light passage 4 is formed, in a manner which is spatially separated from the bearing arrangement 5, in an at least partially elastically yielding the form of a supporting ring 6a. The radial bearing is held in the supporting ring 6a. The supporting ring 6a is a composite part together with, for example, an outer ring of a rotary bearing. The outer ring (which is not shown in further detail) is encapsulated by injection molding in order to manufacture the composite with the plastic of the supporting ring 6a. It is also conceivable that the supporting ring is pressed onto the outer ring.

The light source 2 and the light sensor 3 are mounted on a common mounting plate 7, together with further electronic components 8 and conductors or connecting elements 9, to form a unit 10. The supporting ring 6a has a chamber 11 and a further chamber 12. The chambers 11 and 12 are separated from one another by a radial web 13 of the supporting ring 6a. The light passage 4 is formed in the web 13. The web 13 is designed to be at least elastically yielding enough in the radial direction that the radial gap width S of the light passage 4 is variable as a function of the stresses on the bearing arrangement 5. During the assembly of the measuring device 1, the unit 10 is plugged into the chamber 11 and fastened in the supporting ring 6a. The chamber 11 is closed at the end by way of a cover 14 which can be provided with plated-through holes for connecting conductors and optionally closes the chamber 11 in a watertight manner.

The light source 2 protrudes into the chamber 12 through the web 13. A reflector 15 which is directed at the light passage 4 lies axially opposite the web 13 in the chamber 12. The chamber 12 is also closed at the end by way of a cover 14, to which the reflector 5 can be fastened or can optionally be applied by coating. The light sensor 3 detects the part of the light of the light source 2 which is reflected by the reflector 15 onto the light passage 4 and passes through the light passage 4.

Figure 2:
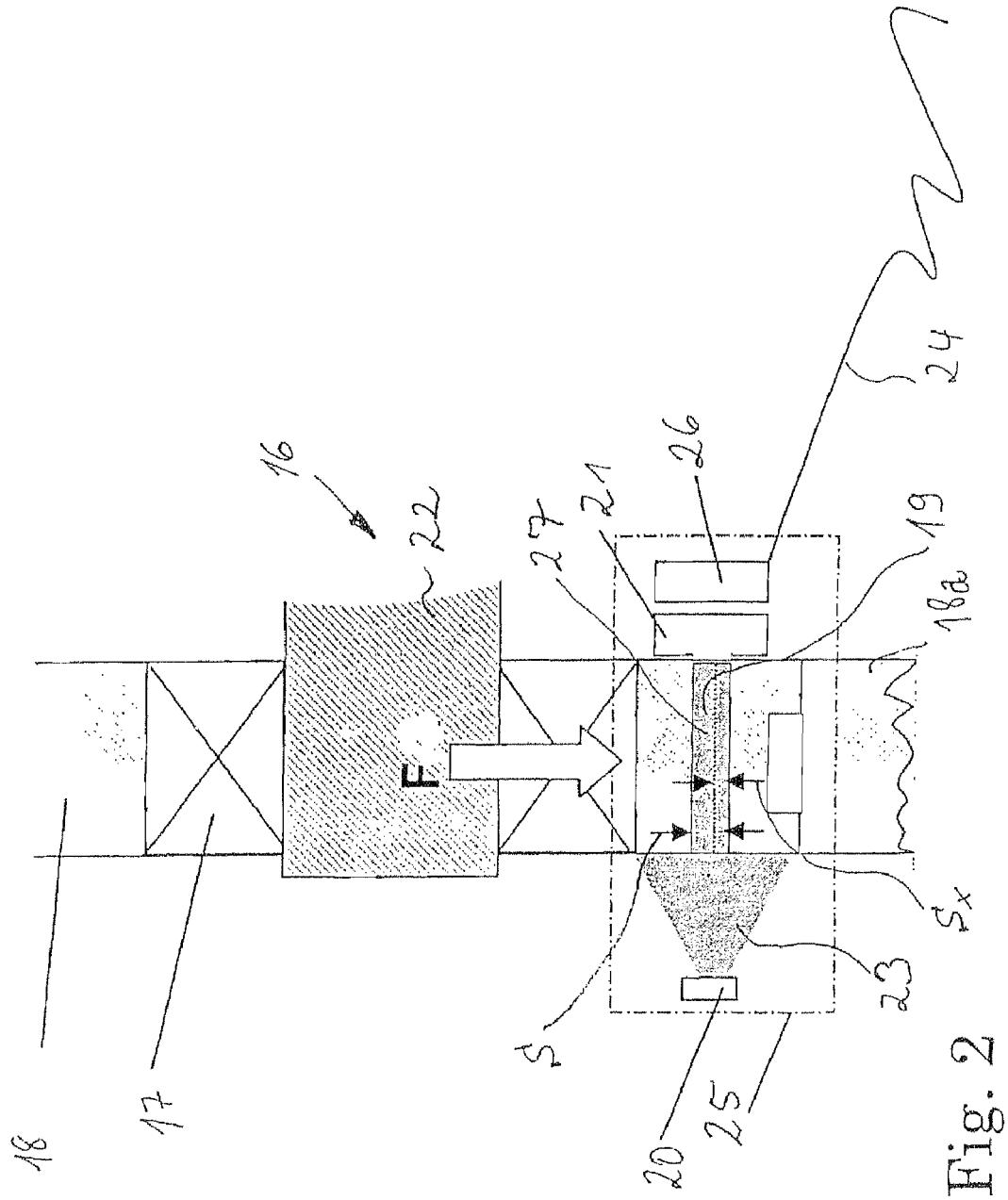
FIG. 2 is a longitudinal sectional view that illustrates a further embodiment of the measuring device.

FIG. 2 schematically shows a further exemplary embodiment of a measuring device 16 for detecting stresses of a bearing arrangement 17. The bearing arrangement is surrounded by a stationary support 18 in the form of a supporting ring 18a. A shaft, of which only the shaft butt 22 is indicated, is mounted rotatably by way of the bearing arrangement 17. The supporting ring 18a is manufactured, for example, from plastic. At least one light passage 19, to which in each case at least one light source 20 and one light sensor 21 are assigned, is formed in the supporting ring 18a in a spatially separate manner from the bearing arrangement 17.

The stresses of the bearing arrangement 17 can be detected using the changes in the gap dimension of the light passage 19 from S to $S_x$ and vice versa. The gap dimension S is dependent on the stresses F and elastic shape changes which result therefrom on the supporting ring 18a in the region of the light passage. One part 27 of the light 23 of the light source 20 which is directed onto the light passage 19 outside the support 18 passes through the light passage 19. That part 23 of the light 22 which is dependent on the size of the gap width S to $S_x$ and therefore on the stresses, for example on the force F, is detected by a light sensor 21 on the side which lies opposite the light source 20, is scanned by an evaluation unit 26 and is forwarded via conductors 24. The sensor system is encapsulated by means of a housing 25 which is shown with a dashed line.

LIST OF DESIGNATIONS

1 Measuring device
2 Light source
3 Light sensor
4 Light passage
5 Bearing arrangement
5a Rotational axis
6 Support
6a Supporting ring
7 Mounting plate
8 Component
9 Connecting element
10 Unit
11 Chamber
12 Chamber
13 Web
14 Cover
15 Reflector
16 Measuring device
17 Bearing arrangement
18 Support
18a Supporting ring
19 Light passage
20 Light source
21 Light sensor
22 Shaft butt
23 Light
24 Conductor
25 Housing
26 Evaluation unit
27 Part

The invention claimed is:
1. A measuring device for detecting stresses of a bearing arrangement wherein the stresses are measured using elastic shape changes, the measuring device comprising at least one light source which directs light into at least one light passage, which is formed in at least one web on a supporting ring, the web extending radially from the bearing arrangement, and having at least one light sensor for measuring the amount of at least one part of the light which passes through the light passage and strikes the light sensor changed by means of the elastic shape changes of the light passage, and the light passage being formed, in a manner which is spatially separated from the bearing arrangement, in an at least partially elastically yielding support which is coupled to the bearing arrangement, and the light passage being deformed elastically by the stresses on the bearing arrangement.

2. The measuring device as claimed in claim 1, on which the bearing arrangement is supported with respect to the stresses at least on that part of the support, on which the light passage is formed.

3. The measuring device as claimed in claim 2, wherein the support having the light passage is the supporting ring for the bearing, and the bearing is at least a rotary bearing.

4. The measuring device as claimed in claim 3, wherein the bearing arrangement is held in the supporting ring.

5. The measuring device as claimed in claim 3, wherein the measuring device is integrated into the supporting ring.

6. The measuring device as claimed in claim 5, wherein the device is a unit which can be plugged into the supporting ring and comprises at least the light source and the light sensor.

7. The measuring device as claimed in claim 5, wherein the device is a unit which can be plugged into the supporting ring and comprises at least one carrier mounting plate for the light source, the light sensor and connection and connecting elements.

8. The measuring device as claimed in claim 3, wherein the supporting ring is made from plastic and is fixed on the bearing arrangement.

9. The measuring device as claimed in claim 8, wherein the light source and at least one of the light sensors lie opposite a reflector in such a way that at least part of the light can be reflected by the reflector onto the light sensor.

10. The measuring device as claimed in claim 1, wherein the light source and at least one of the light sensors lie opposite one another in a manner which is separated from one another by the supporting ring, in such a way that at least one part of the light is directed onto the light sensor through the light passage.

* * * * *